United States Patent
Seibert et al.

(10) Patent No.: US 7,594,994 B1
(45) Date of Patent: Sep. 29, 2009

(54) FCC RISER RESIDENCE TIME EXTENSION DEVICE

(75) Inventors: Kelly D. Seibert, Des Plaines, IL (US); Mindy B. Kuhn, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 623 days.

(21) Appl. No.: 11/244,589

(22) Filed: Oct. 6, 2005

(51) Int. Cl.
*C10G 11/00* (2006.01)
*B01J 8/18* (2006.01)
*B01J 8/24* (2006.01)

(52) U.S. Cl. .................... 208/113; 422/139; 422/144; 422/145

(58) Field of Classification Search ......... 208/113–124; 422/139–147
See application file for complete search history.

(56) References Cited

U.S. PATENT DOCUMENTS

| | | | |
|---|---|---|---|
| 3,841,843 A | 10/1974 | Williams et al. | 23/288 S |
| 3,957,443 A | 5/1976 | Strickland et al. | 23/288 S |
| 4,364,905 A | 12/1982 | Fahrig et al. | 422/144 |
| 4,692,235 A | 9/1987 | Parker et al. | 208/113 |
| 4,756,886 A | 7/1988 | Pfeiffer et al. | 422/144 |
| 5,449,497 A | 9/1995 | Cetinkaya | 422/144 |
| 5,552,120 A | 9/1996 | Sechrist et al. | 422/144 |
| 5,591,411 A | 1/1997 | Terry et al. | 422/139 |
| 2003/0121825 A1 | 7/2003 | Pittman et al. | 208/113 |

OTHER PUBLICATIONS

Smolders, K. and Baeyens, J. (2000). "Overall solids movement and solids residence time distribution in a CFB-riser." Chemical Engineering Science, 55, pp. 4101-4116.*
Bollas, G.M., Vasalos, I.A., Lappas, A.A., and Iatridis, D. (2002). "Modeling small-diameter FCC riser reactors. A hydrodynamic and kinetic approach." Industrial & Engineering Chemistry Research, 41, pp. 5410-5419.*
Wei, F. and Zhu, J-X. (1996). "Effect of flow direction on axial solid dispersion in gas-solids cocurrent upflow and downflow systems." The Chemical Engineering Journal. 64, pp. 345-352.*
Wilson, J.W. (1997). Fluid Catalytic Cracking Technology and Operation. Tulsa: PennWell, 323 pgs.*
Harris, A.T.; Davidson, J.F.; Thorpe, R.B. (2003). "The influence of the riser exit on the particle residence time distribution in a circulating fluidised bed riser." Chemical Engineering Science, 58, pp. 3669-3680.*

* cited by examiner

*Primary Examiner*—Robert J Hill, Jr.
*Assistant Examiner*—Brian McCaig
(74) *Attorney, Agent, or Firm*—James C Paschall

(57) ABSTRACT

A fluidized catalytic cracking process includes fluidizing hydrocarbon and catalyst in a riser having an extension mounted to and surrounding at least a portion of or extending adjacently to the riser, cracking the hydrocarbon with the catalyst in the riser to form a substantially cracked stream, further cracking the hydrocarbon with the catalyst in the extension, wherein the hydrocarbon and the catalyst reverse direction in said extension, and separating the cracked stream from the catalyst.

15 Claims, 1 Drawing Sheet

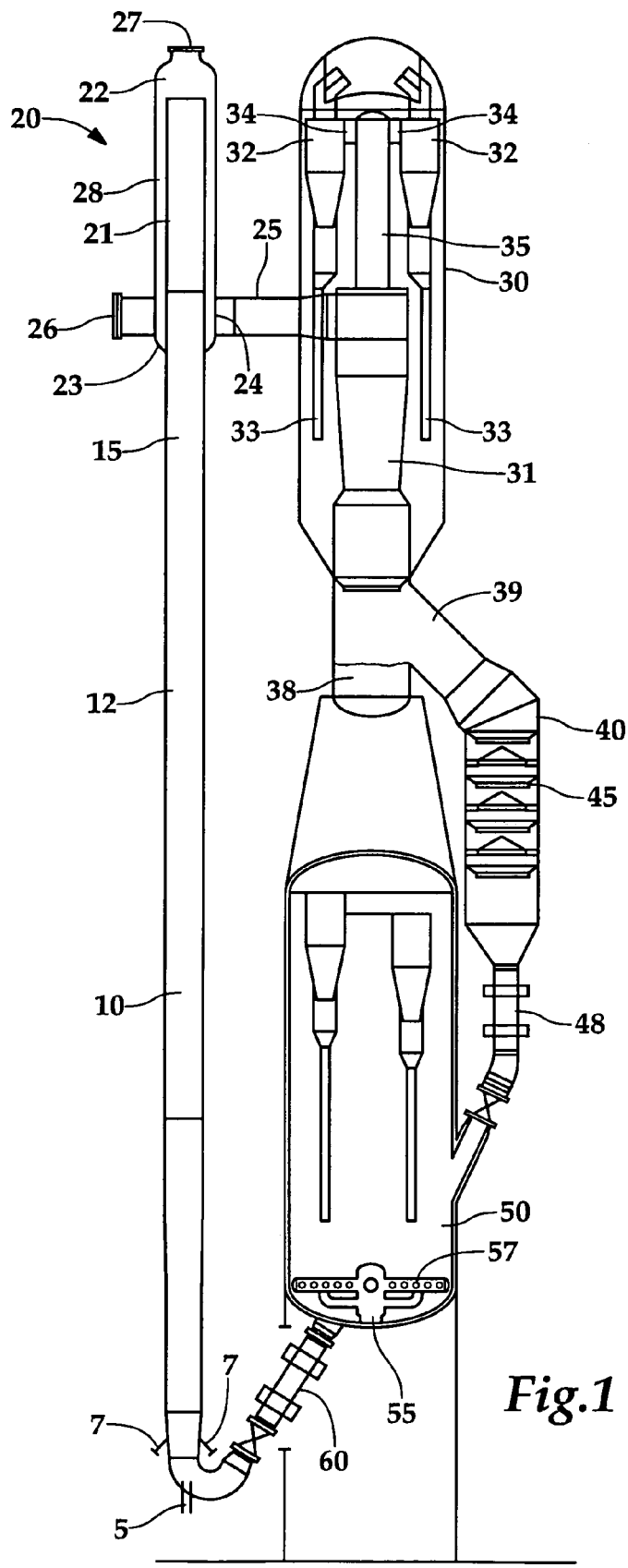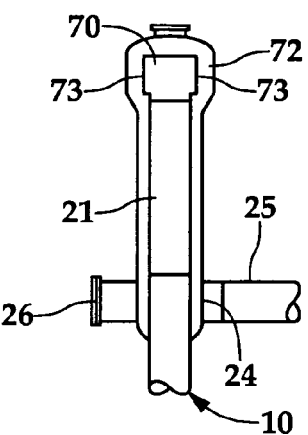
*Fig.1*
*Fig.2*

FCC RISER RESIDENCE TIME EXTENSION DEVICE

BACKGROUND OF THE INVENTION

This invention is directed to a method and a process of catalytically cracking heavy hydrocarbons in a riser.

DESCRIPTION OF THE PRIOR ART

Fluid catalytic cracking (FCC) is a catalytic conversion process of heavy hydrocarbons into lighter hydrocarbons accomplished by contacting the heavy hydrocarbons in a fluidized reaction zone with a catalyst composed of finely divided particulate material. Most FCC units now use zeolite-containing catalyst having high activity and selectivity. As the cracking reaction proceeds, substantial amounts of highly carbonaceous material referred to as coke is deposited on the catalyst, forming spent catalyst. High temperature regeneration burns coke from the spent catalyst. The regenerated catalyst is then returned to the reaction zone. Spent catalyst is continually removed from the reaction zone and replaced by essentially coke free catalyst from the regeneration zone.

The basic components of the FCC process include an internal or external riser, a reactor vessel in which spent catalyst is disengaged from product vapors, a regenerator and a catalyst stripper. In the riser, the hydrocarbon feed contacts the catalyst and is cracked into a product stream containing lighter hydrocarbons. A steam or gas stream is used to accelerate catalyst in a first section of the riser before introduction of the feed. Regenerated catalyst and the hydrocarbon feed are transported upwardly in the riser by the expansion of the gases that result from the vaporization of the hydrocarbons, and other fluidizing mediums, upon contact with the hot catalyst.

The structure of an external riser includes a terminal end that is located outside of the reactor vessel. A transport conduit at the end of the riser directs a mixture of product vapors and catalyst into the reactor vessel containing a number of cyclones for separating spent catalyst from the product stream. The transport conduit may exit into a cyclonic separator contained in the reactor to make a first rough separation of catalyst from product vapors. Conventional designs have incorporated a terminal cap at the end of a riser to reverse the flow of the catalyst and cracked product vapors. Such devices are primarily for the purpose of disengaging catalyst particles from the cracked product stream. These conventional designs involve internal risers with terminal ends located in the reactor vessel. The reversed flow mixture of catalyst and product vapors exit an open bottom end of the cap annular to the riser. The catalyst falls downwardly through the open bottom end into a lower catalyst bed while product vapors ascend from the open bottom end into the open volume of the reactor vessel to effect a rough separation.

Riser residence time is one of the leading factors that determine how effectively the heavy hydrocarbon feed is converted to lighter, more valuable products. Increasing riser residence time increases the percentage of heavy hydrocarbon feed that is converted to lighter products. Unfortunately, increasing residence time can be very expensive. Refiners who wish to increase riser residence time usually take one of two paths to do so: (1) replace existing riser with a larger diameter riser, and (2) increase tangent length on the reactor vessel as part of a larger revamp. Both of these are costly because existing parts must be replaced and feed and steam system piping may be affected if a larger diameter riser is installed. Increasing tangent length of the reactor vessel can be very costly if structure or foundation limits exist.

SUMMARY OF THE INVENTION

A fluidized catalytic cracking process may include fluidizing hydrocarbon and catalyst in a riser having an extension mounted to and extending adjacently to the riser wherein the riser has a top and a bottom, cracking the hydrocarbon with the catalyst in the riser to form a substantially cracked stream, and further cracking the hydrocarbon with the catalyst in the extension, wherein the hydrocarbon and the catalyst reverse direction in said extension, withdrawing the cracked stream and the catalyst out of an outlet in the extension, wherein the outlet is between the top and the bottom, and transporting the cracked stream and the catalyst through a transport conduit and into a reactor vessel. In an embodiment, the extension surrounds at least a portion of the riser. The riser extension serves to prolong the residence time during which the catalyst and feed are in intimate contact to increase conversion and/or throughput. The process also may include separating the cracked stream from the catalyst, and regenerating and recycling the catalyst. In one aspect, the cracking step and the further cracking step may cumulatively occur over a residence time of at least about 2.5 seconds.

In another aspect of the invention, an apparatus for fluid catalytic cracking includes a riser having a top and a bottom for fluidizing and cracking hydrocarbon, an extension proximate the top defining an annulus around the riser for further cracking the hydrocarbon, wherein the extension has an outlet between the top and the bottom, a reactor vessel for separating catalyst from cracked products, and a transport conduit in downstream communication with the outlet, the transport conduit extending from the outlet into the reactor vessel. The apparatus may have a reactor vessel having a plurality of cyclones flowably connected downstream of the extension, and a regenerator flowably connected to the reactor and to the bottom. The extension may include a riser extender atop the riser and an extension vessel substantially enclosing the riser extender.

In still other aspects of the invention, a ratio of the length of the extender to the length of said riser is at least about 15%. A tee disengager may be connected to the top of the riser extender, wherein the tee disengager has substantially horizontal outlets. The extension vessel may be coaxial with the riser extender and the riser. The riser extender has a substantially identical cross sectional area as the riser, and wherein the riser extender coaxially connects to the top. The extension vessel is at least about 150% larger in cross sectional area than the riser extender. A manway may be at an upper portion of said extension. The transport conduit may be substantially horizontal. Moreover, the transport conduit may have an outlet end that is in upstream communication with a disengaging cyclone.

BRIEF DESCRIPTION OF THE DRAWING

FIG. 1 is a cross-sectional elevation view of a riser with connected extension leading into a reactor vessel and a regenerator.

FIG. 2 is a cross-sectional elevation view of the upper portion of a riser with connected extension having a tee disengager on top of the riser extender.

DETAILED DESCRIPTION OF THE INVENTION

This invention relates generally to improved risers for use in an FCC process, and to the improved FCC process. The process and apparatus of this invention can be used to modify the operation and arrangement of existing FCC units or in the design of newly constructed FCC units.

Riser 10 may provide the primary reaction zone to form lighter hydrocarbon product vapors and spent catalyst from a heavy hydrocarbon feed stream and fresh catalyst. A terminal end of the riser is located outside of a reactor vessel 30. The reactor vessel 30, with cyclones 32 which act as separation devices, removes spent catalyst particles from the gaseous product vapors. Stripper 40 removes residual adsorbed hydrocarbons from the surface of the catalyst over baffles 45. Spent catalyst from stripper 40 is regenerated in regenerator 50 having one or more stages of regeneration. Regenerated catalyst from the regenerator 50 re-enters riser 10 to continue the process The temperature in riser 10 may be between about 454° C. and about 593° C. (between about 850° F. and about 1100° F.), preferably between about 482° C. and about 566° C. (between about 900° F. and about 1050° F.), and more preferably between about 510° C. and about 538° C. (between about 950° F. and about 1000° F.). Regenerator 50 may regenerate catalyst at between about 593° C. and about 896° C. (between about 1100° F. and about 1500° F.), preferably between about 649° C. and about 760° C. (between about 1200° F. and about 1400° F.), more preferably between about 660° C. and about 732° C. (between about 1220° F. and about 1350° F.).

As shown in FIG. 1, regenerated catalyst from regenerator 50 is transferred by catalyst conduit 60 to the bottom of riser 10. Acceleration gas of steam, inert gas or hydrocarbon may be injected into the bottom of riser 10 by acceleration gas inlet 5. Additional steam to riser 10 may be introduced along with the hydrocarbon feed by feed injection nozzles 7 and may between about 1% and about 5% of the feed rate. The mixture of feed, catalyst, and acceleration gas travels up intermediate section 12 of riser 10 and into upper section 15 and then into extension 20. The feed is catalytically cracked into product vapors and the catalyst becomes spent catalyst due to the accumulation of coke as a result of the reaction.

Continuing with FIG. 1, extension 20 comprises riser extender 21 and residence time extension vessel 22 substantially surrounding and enclosing riser extender 21 and attached to the outside of upper section 15 to define an annular space for extending residence time. In this regard, residence time extension vessel 22 may be concentric with the riser extender 21. It is also envisioned that the extension vessel could fit against and extend adjacently to the riser extender 21 or surround just a portion of the riser extender 21.

The product and catalyst mixture travels up riser extender 21, reverses direction in residence time extension vessel 22, and exits extension 20 via outlet 24. A closed bottom 23 of the extension vessel 22 prevents catalyst from exiting downwardly from the extension vessel 22. Instead, the mixture of catalyst and product vapors exit via the outlet 24 into a transport conduit 25. The transport conduit 25 directs the mixture from the outlet 24 into reactor vessel 30 for disengagement of spent catalyst from the product vapors. Outlet 24 leads into transport conduit 25 which is in downstream fluid communication with cyclones 31, 32. The transport conduit is preferably substantially horizontal, but may be disposed at an angle with respect to horizontal. Cyclones remove spent catalyst particles from product vapors which exit the top of reactor vessel 30. Spent catalyst travels to bottom of reactor vessel 30 via diplegs 33. From the bottom of reactor vessel 30 the spent catalyst enters stripper 40 through connector 39. The transport conduit may enter into the reactor vessel 30 and exit into a disengaging cyclone 31. Disengaged catalyst drops from the disengaging cyclone 31 down into a lower catalyst bed 38 and spills into connector 39 while product vapors and entrained catalyst ascend gas recovery conduit 35 and enter cyclones 32 via cyclone ducts 34. Spent catalyst exits from the diplegs 33 into catalyst bed 38 via windows (not shown) in a lower end of the disengaging cyclone 31.

Stripper 40 removes adsorbed hydrocarbons from the surface of the catalyst by counter-current contact with steam. The spent catalyst then enters regenerator 50 through regenerator conduit 48 where coke is combusted from the surface of the catalyst particles by contact with an oxygen-containing gas. The oxygen-containing gas enters regenerator 50 via oxygen inlet 55 and is distributed and fluidized upwardly by distributor 57. The oxygen passes through a fluidized bed of catalyst (not shown). After the coke is combusted, the spent catalyst is regenerated for further catalytic activity. The regenerated catalyst is transferred to the bottom of riser 10 by catalyst conduit 60.

FCC units may be revamped in accordance with this invention to increase capacity beyond the design capacity of the unit. Most of these operating units are also designed for full riser cracking. As the feed rate to the unit increases, the riser residence time decreases. Riser residence time below about 2 seconds starts to negatively affect the yields on the unit. Increasing riser residence time on FCC units that are running lower than about 2 seconds can dramatically increase the unit's profitability by increasing the unit conversion. For FCC units in which the riser residence time ranges from about 0.8 to about 1.8 seconds, doubling the riser residence time can increase the unit conversion by up to about 8 vol-%.

The invention could also be used in new unit applications where an external riser is recommended. By doing so the total height of the reactor could be decreased, thereby decreasing the total cost of reactor vessel 30, foundation and structure.

Extension 20 may increase the riser residence time by between about 0.1 seconds and about 1.5 seconds, preferably between about 0.2 seconds and about 1 second, and in one embodiment about 0.7 seconds. Increasing the riser residence time increases the unit conversion by between about 1 vol-% and about 10 vol-%, preferably between about 2 vol-% and about 8 vol-%, and in one embodiment about 3 vol-%.

The flow rate of catalyst and feed may be dependent on the unit and the specifics of the feed. Typically, an FCC unit may have a feed flow rate of between about 2500 barrels per day and about 200,000 barrels per day. The catalyst flow in an FCC unit may be between about 5 and about 18 times as much as the feed flow on a weight basis.

As shown in FIG. 1, extension 20 may extend the reaction time for hydrocarbon feed entering riser 10 by increasing the path the feed and catalyst mixture travels before disengagement in reactor vessel 30. Extension 20 is attached to upper section 15 of riser 10 and leads into reactor vessel 30. Blind flange 26 offers an inspection port for riser 10, riser extender 21, residence time extension vessel 22, and cross duct transport conduit 25. Additionally, there may be a manway 27 at the top of residence time extension vessel 22 for maintenance and inspection.

In operation the hydrocarbon and catalyst will travel up riser 10 into extension 20. The feed, catalyst, and product vapor mixture then may be required to change direction and travel back down residence time extension vessel 22 substantially the same distance as the travel in riser extender 21. In this way, the riser residence time increase is twice as much as would be expected in a riser extender alone, and the hydrocarbon and catalyst will continue to enter reactor vessel 30 at the original location.

It may be deemed unnecessary to keep the riser cross-sectional area the same as the open area on down-flowing portion 28 within residence time extension vessel 22 since the catalyst is down-flowing so that back-mixing or catalyst slip is not a concern. If so, the volume of residence time extension vessel 22 may be increased to further increase the residence time.

Ideally the feed, catalyst, and product vapor mixture may move in a plug flow regime to get the best product selectivity. In a plug flow regime, the catalyst and hydrocarbon vapor are flowing at the same speed up the riser, thereby eliminating back mixing or catalyst slip. Back mixing of the catalyst or slippage in the riser can lead to less selective cracking of the heavy oil to less profitable very light hydrocarbon gas. Extension 20 may interfere with the plug flow, but the benefits of the additional residence time far outweigh the loss of selectivity at the end of riser 10.

As shown in FIG. 2, in an alternative embodiment, extension 20 may comprise vented riser extender 21 with tee disengager 70 on top of riser extender 21 which in turn resides atop upper section 15 of riser 10. Tee disengager 70 may direct the mixture out of horizontal tee outlets 73 and may decrease catalyst flow back down riser 10. Tee disengager 70 with riser extender 21 may fit inside residence time extension vessel 72 which is modified somewhat from residence time extension vessel 22 to accommodate tee disengager 70. In this regard, the top portion of residence time extension vessel 72 may bulge outwardly to provide adequate volume around tee disengager 70 for the spent catalyst and product vapor mixture to descend down residence time extension vessel 72. In one embodiment, residence time extension vessel 72 bulges outwardly to provide an internal diameter of between about 6 feet and about 10 feet (between about 1.8 m and about 3 m), and in one embodiment, about 8 feet at its widest (about 2.4 m). In the same embodiment, the internal diameter at the narrowest portion of extension vessel may be between about 4 feet and about 8 feet (between about 1.2 m and about 2.4 m), and in one embodiment, about 5.8 feet (about 1.77 m).

Prefabricated extension 20 may be attached to riser 10 by cutting off the top of riser 10 and a portion of transport conduit 25. Riser extender 21 located within residence time extension vessel 22 may be welded to the top of riser 10 with residence time extension vessel 22 welded to the side of riser 10. Residence time extension vessel 22 has outlet 24 which is welded to transport conduit 25. Riser 10 and riser extender 21 may have identical internal diameters of between about 0.6 m and about 3 m (between about 2 feet and about 10 feet), preferably between about 0.9 m and about 1.5 m (between about 3 feet and about 5 feet), and in one embodiment about 1.1 m (3.6 feet). Residence time extension vessel 22 may have an internal diameter of between about 0.9 m and about 4.6 m (between about 3 feet and about 15 feet), preferably between about 1.2 m and about 2.1 m (between about 4 feet and about 7 feet), and in one embodiment about 1.8 m (about 6 feet). The ratio of internal diameter of riser extender 21 to that of residence time extension vessel 22 may be between about 50% and about 70%, preferably between about 60% and about 65%, and in one embodiment about 63%.

Extension 20 may be between about 3 m and about 15.2 m (between about 10 feet and about 50 feet) in length, preferably between about 4.6 m and about 9 m (15 feet and about 30 feet) in length, and in one embodiment about 7 m (about 23 feet) in length. Extension 20 may be between about 10% and about 30% of the length of riser 10, preferably between about 13% and about 25% of riser 10, and in one embodiment about 18% of riser 10. Riser extender 21 may have a length of between about between about 3.7 m and about 7.6 m (12 feet and about 25 feet), preferably a length of between about 4.6 m and about 6.7 m (between about 15 feet and about 22 feet), and in one embodiment a length of about 5.8 m (about 19 feet). Extension vessel may have a length between about 4.6 m and about 9 m (15 feet and about 30 feet), preferably a length of between about 6 m and about 8 m (between about 20 feet and about 27 feet), and in one embodiment a length of about 7 m (about 23 feet). The length percentage of riser extender 21 to residence time extension vessel 22 may be between about 70% and about 95%, preferably between about 75% and about 88%, and in one embodiment about 83%.

Riser extender 21 may be made of steel mixture having about 1.25% chrome and about 0.5% molybdenum. Residence time extension vessel 22 may be carbon steel with refractory lining. The materials of both riser extender 21 and residence time extension vessel 22 may depend on the temperature of the FCC reaction.

In summary, a fluidized catalytic cracking process may include fluidizing hydrocarbon and catalyst in a riser having an extension mounted to and extending adjacently to the riser, cracking the hydrocarbon with the catalyst in the riser to form a substantially cracked stream, further cracking the hydrocarbon with the catalyst in the extension, wherein the hydrocarbon and the catalyst reverse direction in said extension, transporting the catalyst from the extension through a transport conduit into a reactor vessel, separating the cracked stream from the catalyst, and regenerating and recycling the catalyst. The cracking step and the further cracking step may cumulatively occur for a length of time of at least about 2.5 seconds. The extension may surround at least a portion of the riser.

An apparatus for fluid catalytic cracking includes riser 10 having a top and a bottom for fluidizing and cracking hydrocarbon, extension 20 proximate the top defining an annulus around riser 10 for further cracking the hydrocarbon. The apparatus also may have reactor vessel 30 having a plurality of cyclones 32 flowably connected downstream of extension 20, and regenerator 50 flowably connected to reactor vessel 30 and to the bottom of riser 10. The extension may include riser extender 21 atop riser 10 and residence time extension vessel 22 substantially enclosing riser extender 21. Extension 20 may have outlet 24 positioned between the top and the bottom of the extension. A transport conduit may communicate the outlet 24 with the reactor vessel 30 which includes communicating with vessels in the reactor vessel 30.

A ratio of the length of riser extender 21 to the length of riser 10 may be at least about 15% and may be about 18%. Tee disengager 70 may be connected to the top of riser extender 21, wherein tee disengager 70 has substantially horizontal tee outlets 73. Extension vessels 22 or 72 may be coaxial with riser extender 21 and riser 10. Riser extender 21 has a substantially identical cross sectional area as riser 10, and riser extender 21 coaxially connects to the top of riser 10. Extension vessels 22 or 72 may be at least about 150% larger in cross sectional area than riser extender 21. A manway may be at an upper portion of riser extender 21.

While the foregoing written description of the invention enables one of ordinary skill to make and use what is considered presently to be the best mode thereof, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the appended claims.

EXAMPLE

Riser Residence Time Extension

In this example, an FCC unit increased the riser residence time of the heavy hydrocarbon feed and the catalyst from 1.7 seconds to 2.7 seconds with riser extension 20 which includes riser extender 21 of 6 m (19 feet) high inside a residence time extension vessel 22 of 7 m (23 feet) high. The apparatus specifics below enable the riser residence time increase. The FCC unit processed 20,000 barrels per day and had a residence time in the riser of 1.7 seconds and a residence time in the extended riser plus in the extension vessel of 2.7 seconds.

What is claimed is:

1. A fluidized catalytic cracking process, comprising:
    fluidizing hydrocarbon and catalyst in a riser having an extension mounted to and extending adjacently to said riser, wherein said riser has a top and a bottom;
    cracking said hydrocarbon with said catalyst in said riser to form a substantially cracked stream;
    further cracking said hydrocarbon with said catalyst in said extension, wherein said hydrocarbon and said catalyst reverse direction in at least a portion of said extension;
    withdrawing said cracked stream and all of said catalyst out of an outlet in said extension, wherein said outlet is between said top and said bottom of said riser; and
    transporting said cracked stream and said catalyst from said outlet in said extension through a conduit and into a reactor vessel.

2. The process of claim 1 further comprising separating said cracked stream from said catalyst and regenerating and recycling said catalyst.

3. The process of claim 1 wherein said cracking step and said further cracking step cumulatively occur over a residence time of at least about 2.5 seconds.

4. The process of claim 1 wherein said extension surrounds at least a portion of said riser.

5. The process of claim 1 wherein said transport conduit exits into a disengaging cyclone.

6. An apparatus for fluid catalytic cracking comprising:
    an external riser having a top and a bottom for fluidizing and cracking hydrocarbon;
    an extension proximate said top and extending adjacently to said riser for further cracking said hydrocarbon, wherein said extension has an outlet between said top and said bottom of said riser;
    a reactor vessel for separating catalyst from cracked products; and
    a transport conduit in downstream communication with said outlet, said transport conduit extending from said outlet into said reactor vessel.

7. The apparatus of claim 6 wherein said reactor has a plurality of cyclones flowably connected downstream of said extension and a regenerator flowably connected to said reactor and to said bottom of said riser.

8. The apparatus of claim 6 wherein said extension comprises a riser extender atop said riser and an extension vessel substantially surrounding said riser extender.

9. The apparatus of claim 6 wherein a ratio of length of said extender to length of said riser is at least about 15%.

10. The apparatus of claim 8 further comprising a tee disengager connected to a top of said riser extender, wherein said tee disengager has substantially horizontal outlets.

11. The apparatus of claim 8 wherein said extension vessel is coaxial with said riser extender and said riser.

12. The apparatus of claim 8 wherein said riser extender has a substantially identical cross sectional area as said riser, and wherein said riser extender coaxially connects to said top.

13. The apparatus of claim 8 wherein said extension vessel is at least about 150% larger in cross sectional area than said riser extender.

14. The apparatus of claim 6 further comprising a manway at an upper portion of said extension.

15. The apparatus of claim 6 wherein an outlet end of said conduit exits into a disengaging cyclone.

\* \* \* \* \*

UNITED STATES PATENT AND TRADEMARK OFFICE
CERTIFICATE OF CORRECTION

PATENT NO. : 7,594,994 B1 Page 1 of 1
APPLICATION NO. : 11/244589
DATED : September 29, 2009
INVENTOR(S) : Seibert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Twenty-eighth Day of September, 2010

David J. Kappos
*Director of the United States Patent and Trademark Office*